United States Patent [19]
Huebner

[11] 3,715,348
[45] Feb. 6, 1973

[54] SPIRO AZIRIDINE-ETHENOANTHRACENE COMPOUNDS

[75] Inventor: Charles Ferdinand Huebner, Chatham, N.J.

[73] Assignee: Ciba-Geigy Corporation, Ardsley, N.Y.

[22] Filed: June 19, 1970

[21] Appl. No.: 47,906

[52] U.S. Cl........260/239 E, 260/465 G, 260/558 R, 260/558 A, 260/559 R, 260/561 R, 260/570.5 R, 260/999
[51] Int. Cl...C07c 87/28, C07c 103/34, C07d 23/02
[58] Field of Search ..................................260/239 E

[56] References Cited

UNITED STATES PATENTS 2,694,704  11/1954  Gassenmeier et al. ................260/239

Primary Examiner—Alton D. Rollins
Attorney—Harry Goldsmith, Joseph G. Kolodny and Mario A. Monaco

[57] ABSTRACT

Process for the preparation of 11-N-acylaminomethyl-9,10-ethenoanthracenes of the formula

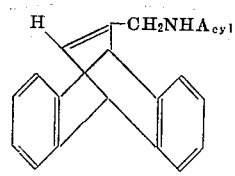

which are antidepressants, by pyrolytic isomerization of the corresponding 11-spiro-attached N-acylaziridines.

4 Claims, No Drawings

SPIRO AZIRIDINE-ETHENOANTHRACENE COMPOUNDS

BACKGROUND OF THE INVENTION

11-N-acylaminomethyl-9,10-ethenoanthracenes, which are useful as antidepressants, have been prepared by conventional methods as described in Belgian and South African Patents Nos. 730,929 and 2234/69, respectively.

Surprisingly, it was found that said anthracenes can be more easily, efficiently and inexpensively obtained by pyrolytic isomerization of corresponding 11-spiro-attached N-acylaziridines in high yields.

SUMMARY OF THE INVENTION

The present invention concerns and has for its object the provision of a new process for the preparation of 11-N-acylaminomethyl-9,10-ethenoanthracenes of formula

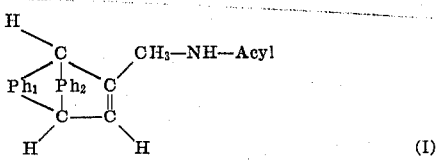

(I)

in which each of $Ph_1$ and $Ph_2$ is 1,2-phenylene and Acyl is derived from an aliphatic, araliphatic or aromatic carboxylic acid, which comprises isomerizing a compound of the formula

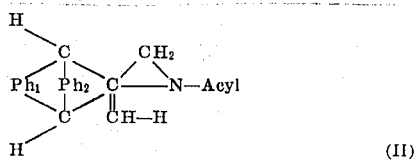

(II)

in which $Ph_1$, $Ph_2$, and acyl have the above meanings, by pyrolysis. The resulting products are useful antidepressants, for example, in the treatment or management of exogenous or endogenous depressions.

DESCRIPTION OF THE PREFERRED EMBODIMENTS

The process of the invention comprises the pyrolysis of acylaziridines of the Formula II, wherein "Acyl" is preferably derived from aliphatic or araliphatic carboxylic acids, such as lower alkanoic or $R_4$-phenyl-lower alkanoic acids, wherein $R_4$ is for example, hydrogen; lower alkyl, e.g., methyl, ethyl, n- or i-propyl or -butyl; hydroxy; lower alkoxy, e.g., methoxy, ethoxy, n-or i-proxy or -butoxy; halo, e.g., fluoro, chloro or bromo; tri-fluoromethyl; nitro; amino, or di-lower alkylamino, e.g., dimethylamino or diethylamino. Preferred acyl derivatives are those of formic, acetic, propionic, pivalic, phenylacetic, α-phenylpropionic, β-phenylpropionic, benzoic, toluic, p-methoxybenzoic, p-chlorobenzoic, p-bromobenzoic or p-nitrobenzoic acid. The term "lower," referred to above and hereinafter in connection with organic radicals or compounds respectively, defines such with up to seven, preferably up to four, carbon atoms.

Particularly useful as starting materials for the process of the invention are the compounds of formula II, in which "Acyl" is derived from lower alkanoic or $R_4$-phenyl-lower alkanoic acids, e.g., benzoic, toluic, chlorobenzoic or nitrobenzoic acid.

Especially valuable are the compounds of formula II, in which Acyl is formyl, acetyl, propionyl, benzoyl or p-nitrobenzoyl, or above all the N-acetyl- or N-p-nitrobenzoyl-spiro[9, 10-ethanoanthracene-11,2'-aziridines].

Advantageously, the pyrolysis is carried out at temperatures between about 100° and 250°, preferably between about 100°–200°, or especially between about 100° and 160° in the presence or absence of an inert diluent. Said inert diluent can be in the form of a solid, such as glass powder, sand or copper powder, or a liquid, such as an inert organic solvent, of which the boiling points are between temperatures of about 100°–250°, preferably about 100°–200° or especially about 100°–160°. Particularly valuable as inert organic solvents are aliphatic or aromatic hydrocarbons, whose boiling points correspond to the above-mentioned temperatures, such as higher alkanes or mixtures thereof, e.g., decane, dodecane or kerosene, or especially alkylated benzenes, e.g., mesitylene, durene, isodurene, o-, m- or p- xylene, or above all toluene or xylene, which is a commercial grade containing mostly o- xylene. Thus, more advantageously the pyrolysis is carried out at reflux in toluene or xylene.

The invention also comprises any modification of the above process in which the starting material is formed under the reaction conditions. For example, acylation to form the starting material of the Formula II and its isomerization to a compound of Formula I can be carried out in one step by adding one equivalent of an acylating agent, such as ethyl or methyl formate, to a heated mixture of the N-unsubstituted aziridine in the presence of an inert solvent, followed by distillation of the generated alcohol.

The starting materials are new and also form a part of the present invention. They can be prepared according to methods known per se. For example, the starting material of the formula II is prepared by reacting anthracene with the compound

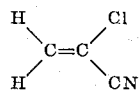

The adduct is reduced with the use of complex di-light metal hydrides, .g. an alkali metal aluminum hydride, such as lithium aluminum hydride, to give the N-unsubstituted aziridine. This is then acylated according to conventional methods, using, e.g., esters, such as lower alkylesters; halides, e.g., chlorides or bromides, or anhydrides, e.g., simple, mixed or ketenes corresponding to the above-mentioned acids.

The products of the invention can either be used as such or as intermediates in the preparation of other valuable products, for example those described in the above cited Patents. Thus, for example, the compounds of formula I can either be hydrolyzed more advantageously under alkaline conditions, e.g., with alkali metal hydroxides, such as sodium or potassium hydroxide, to yield the corresponding primary amines, or reduced, preferably with the above-mentioned alkali metal aluminum hydrides, e.g., lithium aluminum hydride, or with boron hydride, to yield the corresponding secondary amines. For example, from lower-alkanoyl derivatives of Formula I, the corresponding 11-lower alkylaminomethyl-9,10-ethenoanthracenes are obtained. These, or the former primary amines, can be converted into the corresponding tertiary amines either by reacting them with reactive esters of lower alkanols, e.g., the halides or sulfonates thereof, such as, ethyl or methyl bromide, - chloride or p-toluenesulfonate, or by reductive alkylation, i.e., reacting them with lower alkanals, e.g., formaldehyde, in the presence of formic acid or its reactive derivatives.

The following examples are intended to illustrate the invention and are not to be construed as being limitations thereon. Temperatures are given in degrees Centigrade, and all parts wherever given are parts by weight.

EXAMPLE 1

The mixture of 10 g N-acetyl-spiro[9,10-ethanoanthracene-11,2'-aziridine] and 50 ml of xylene is refluxed for 18 hours. Evaporation of the solvent and recrystallization of the crude product from methanol afford 11-N-acetylaminomethyl-9,10-ethenoanthracene of the formula

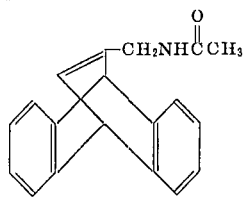

m.p. 170°.

The starting material is prepared as follows:

The mixture of 150 g of anthracene, 85 ml of 2-chloroacrylonitrile, 900 ml of xylene and 0.1 g of hydroquinone is refluxed for 5 days in a nitrogen atmosphere and evaporated in vacuo. The crude solids are dissolved in chloroform; the solution treated with charcoal, filtered and evaporated. The solids are recrystallized from ethanol to give 11-chloro-11-cyano-9,10-ethanoanthracene of the formula

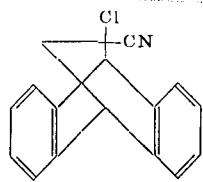

m.p. 138°-43°.

The solution of 24 g thereof in 150 ml of tetrahydrofuran is added dropwise to the suspension of 6 g of lithium aluminum hydride in 150 ml of diethyl ether. The reaction mixture is stirred at room temperature for 24 hours and decomposed in the cold by the dropwise addition of 6 ml of water, 12 ml of 12 percent sodium hydroxide solution and 18 ml of water. The inorganic salts are filtered off and the mixture evaporated in vacuo to afford the spiro[9,10-ethanoanthracene-11,2'-aziridine] of the formula

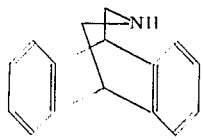

To the cooled solution of 4.0 g thereof and 2.4 ml of triethylamine in 25 ml of benzene is added dropwise with stirring the solution of 1.2 ml of acetyl chloride in 50 ml of benzene. The triethylamine hydrochloride formed is filtered off and the benzene solution evaporated. The product thus obtained may be used as such in the above pyrolysis step, or recrystallized from methanol, to afford N-acetyl-spiro[9,10-ethanoanthracene-11,2'-aziridine] of the formula

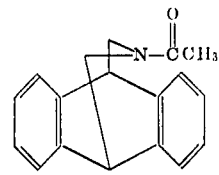

m.p. 120°.

EXAMPLE 2

The solution of 20 g of N-p-nitrobenzoyl-spiro[9,10-ethanoanthracene-11,2'-aziridine] in 1 liter of toluene is refluxed for 48 hours. Evaporation of the toluene and recrystallization of the crude solids from acetone give 11-N-p-nitrobenzoylaminomethyl-9,10-ethenoanthracene of the formula

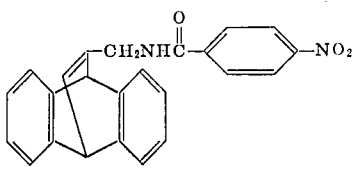

m.p. 292°-3°.

A starting material is prepared as follows:

To the cooled solution of 30 g of spiro[9,10-ethanoanthracene-11,2'-aziridine] (Example 1) and 18 ml of triethylamine in 200 ml of benzene is added dropwise the solution of 24 g of p-nitrobenzoylchloride in 400 ml of benzene. The reaction mixture is stirred at room temperature for 2 hours and the triethylamine hydrochloride filtered off. The benzene solution is evaporated; the crude mass crystallized with ethanol, and the solids are recrystallized from acetone-ethanol to give N-p-nitrobenzoyl-spiro[9,10-ethanoanthracene-11,2'-aziridine] of the formula

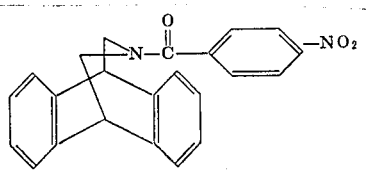

m.p. 165°.

EXAMPLE 3

The mixture of 8.0 g 11-N-acetylaminomethyl-9,10-ethenoanthracene 10 g potassium hydroxide, 50 ml ethanol and 20 ml water is refluxed for 30 hours. The ethanol is evaporated in vacuo and the mixture is diluted with water and extracted with diethyl ether. The solution is evaporated to give the free amine as an oil, which is used as such in the following step. Treatment of the oil with ethanolic hydrogen chloride affords 11-aminomethyl-9,10-etheno-anthracene hydrochloride of formula

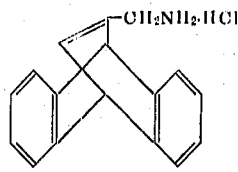

m.p. 216°–18°.

The solution of 1.0 g of the free amine thereof in 10 ml n-propanol is treated with 0.85 ml formic acid followed by 0.95 ml 37 percent formalin (aqueous formaldehyde). The mixture is refluxed for 24 hours and evaporated in vacuo. The residue is made alkaline with aqueous sodium hydroxide and extracted with diethyl ether. The diethyl ether solution is dried and evaporated. Treatment of the residue with ethanolic hydrogen chloride gives 11-N,N-dimethylaminomethyl-9,10-ethenoanthracene hydrochloride of the formula

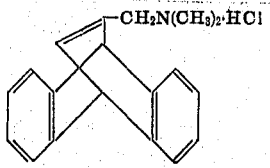

m.p. 284°–5° (dec.).

I claim:

1. A compound of the formula

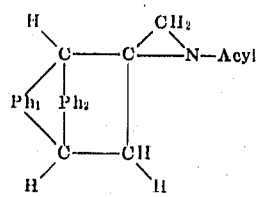

in which each of $Ph_1$ and $Ph_2$ is 1,2-phenylene, Acyl is lower alkanoyl or $R_4$-phenyl-lower alkanoyl and $R_4$ is hydrogen, lower alkyl, hydroxy, lower alkoxy, halo, trifluoromethyl, nitro, amino or di-lower alkylamino.

2. A compound as claimed in claim 1, in which formula each of $Ph_1$ and $Ph_2$ is 1,2-phenylene and Acyl

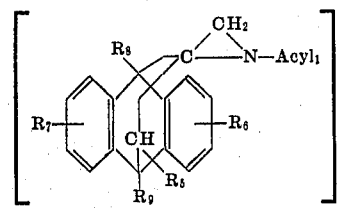

is lower alkanoyl, benzoyl, toluoyl, chlorobenzoyl or nitrobenzoyl.

3. A compound as claimed in claim 1, in which formula each of $Ph_1$ and $Ph_2$ is 1,2-phenylene and Acyl is formyl, acetyl, propionyl, benzoyl or p-nitrobenzoyl.

4. A compound as claimed in claim 1 and being the N-acetyl-spiro[9,10-ethanoanthracene-11,2--aziridine].

* * * * *

PO-1050
(5/69)

UNITED STATES PATENT OFFICE
CERTIFICATE OF CORRECTION

Patent No. 3,715,348  Dated February 6, 1973

Inventor(s) CHARLES FERDINAND HUEBNER

It is certified that error appears in the above-identified patent and that said Letters Patent are hereby corrected as shown below:

Column 6, claim 2, delete the structural formula.

Column 6, claim 4, line 30, delete "2--" and insert --- 2'- ---.

Signed and sealed this 11th day of June 1974.

(SEAL)
Attest:

EDWARD M. FLETCHER, JR.
Attesting Officer

C. MARSHALL DANN
Commissioner of Patents